(12) United States Patent
Choi et al.

(10) Patent No.: US 11,835,230 B2
(45) Date of Patent: Dec. 5, 2023

(54) CYCLONIC PLASMA MELTING FURNACE

(71) Applicant: KOREA INSTITUTE OF FUSION ENERGY, Daejeon (KR)

(72) Inventors: Yong Sup Choi, Gunsan-si (KR); Dae Hyun Choi, Gunsan-si (KR); In Je Kang, Gunsan-si (KR); Ji Hun Kim, Gunsan-si (KR); Sung Hoon Jee, Daejeon (KR); Dong Hun Shin, Gunsan-si (KR); Seong Bong Kim, Gunsan-si (KR); Soon Mo Hwang, Seoul (KR); Chi Kyu Choi, Daegu (KR)

(73) Assignee: KOREA INSTITUTE OF FUSION ENERGY, Daejeon (KR)

( * ) Notice: Subject to any disclaimer, the term of this patent is extended or adjusted under 35 U.S.C. 154(b) by 364 days.

(21) Appl. No.: 17/113,036

(22) Filed: Dec. 5, 2020

(65) Prior Publication Data
US 2022/0065446 A1    Mar. 3, 2022

(30) Foreign Application Priority Data
Aug. 26, 2020  (KR) .................. 10-2020-0107963

(51) Int. Cl.
| | | |
|---|---|---|
| F23G 5/08 | (2006.01) |
| B09B 3/29 | (2022.01) |
| B09B 3/40 | (2022.01) |
| F23G 5/32 | (2006.01) |
| F27D 3/15 | (2006.01) |
| F27D 11/08 | (2006.01) |
| F27D 99/00 | (2010.01) |

(52) U.S. Cl.
CPC ............... *F23G 5/085* (2013.01); *B09B 3/29* (2022.01); *B09B 3/40* (2022.01); *F23G 5/32* (2013.01); *F27D 3/1518* (2013.01); *F27D 11/08* (2013.01); *F23G 2202/20* (2013.01); *F23G 2203/30* (2013.01); *F23G 2204/201* (2013.01); *F27D 2099/0031* (2013.01)

(58) Field of Classification Search
CPC ........ F23G 5/085; F23G 5/32; F23G 2202/20; F23G 2203/30; F23G 2204/201; F27D 11/08; F27D 2099/0031
See application file for complete search history.

(56) References Cited

U.S. PATENT DOCUMENTS

| | | | | |
|---|---|---|---|---|
| 4,831,944 A | * | 5/1989 | Durand ................... | C10B 49/02 |
| | | | | 48/209 |
| 5,280,757 A | * | 1/1994 | Carter ..................... | C03B 5/025 |
| | | | | 48/209 |

(Continued)

FOREIGN PATENT DOCUMENTS

KR   10-0508129 B    8/2005

*Primary Examiner* — David J Laux
(74) *Attorney, Agent, or Firm* — INSIGHT LAW GROUP, PLLC; Seung Lee

(57) ABSTRACT

Provided is a cyclonic plasma melting furnace. A melting furnace chamber body includes an inlet through which waste is input and an outlet through which air or gas is discharged. The outlet is provided in a direction opposite to the inlet. At least one plasma torch is provided on the melting furnace chamber body so as to be inclined at a predetermined angle with respect to a direction in which the air or the gas is discharged through the outlet.

10 Claims, 11 Drawing Sheets
(5 of 11 Drawing Sheet(s) Filed in Color)

(56) References Cited

U.S. PATENT DOCUMENTS

| | | | | |
|---|---|---|---|---|
| 7,665,407 B2 * | 2/2010 | Hwang | ................... | F23G 5/32 |
| | | | | 110/229 |
| 7,832,344 B2 * | 11/2010 | Capote | ................... | F23N 5/003 |
| | | | | 110/229 |
| 2004/0159366 A1 * | 8/2004 | Tsangaris | ................ | F23G 7/00 |
| | | | | 141/59 |
| 2014/0309474 A1 * | 10/2014 | Hwang | ................... | B09B 3/40 |
| | | | | 588/311 |

* cited by examiner

CYCLONIC PLASMA MELTING FURNACE

CROSS-REFERENCE TO RELATED APPLICATION

This application claims priority to Korean Patent Application No. 10-2020-0107963, filed on Aug. 26, 2020, which is incorporated herein by reference in their entirety.

BACKGROUND

1. Technical Field

The present disclosure relates to a cyclonic plasma melting furnace.

2. Related Art

Recently, the production of industrial waste, household waste, and the like is rapidly increasing, due to rapid industrialization and population growth. While such waste has generally been buried in landfills, such a waste burial method may be problematic in that it is difficult to secure landfills, and that environmental issues, such as subterranean water pollution or soil pollution, may occur.

In this regard, a technology of pyrolysis melting and gasification for waste using a plasma torch has been developed in order to reduce the problem of environmental pollution while more efficiently processing waste. The plasma torch serves to generate a plasma jet from plasma gas ionized using a high-voltage and high-current arc. The use of the plasma torch may reliably form and maintain a melt and produce a high-temperature environment of 1,400° C. or higher within a gasification melting furnace.

When waste is processed using the plasma torch, due to the high temperature and the high heat capacity of the plasma torch, an organic compound may be decomposed into a chemically-stable compound, such as C, CnHm, CO, or $H_2$, and combustion gas, and an inorganic compound may be melted and decomposed into extremely fine matter or vitrified into a solid. When waste is processed using the plasma torch in this manner, combustion gas from which harmful matter is removed by the pyrolysis may be produced, and waste is vitrified and processed into a non-eluting form due to melting. Thus, it is possible to reduce the problem of environmental pollution while efficiently processing waste.

Accordingly, there is a need for a more effective waste disposal apparatus in order to reduce the problem of environmental pollution while efficiently processing waste so that industrial waste is not finally buried.

DOCUMENTS OF BACKGROUND ART

Patent Document (Patent Document 0001) Korean Patent Application Publication No. 10-0508129 (Aug. 4, 2005)

SUMMARY

Various embodiments are directed to provide a cyclonic plasma melting furnace able to effectively thermally decompose and melt waste in the entire area thereof, in which waste is received, by arranging plasma torches thereof in a specific structure.

The objective of the present disclosure is not limited to the aforementioned description, and other objectives not explicitly disclosed herein will be clearly understood by those skilled in the art from the description provided hereinafter.

In an embodiment, a cyclonic plasma melting furnace may include: a melting furnace chamber body including an inlet through which waste is input and an outlet through which air or gas is discharged, the outlet being provided in a direction opposite to the inlet; and at least one plasma torch provided on the melting furnace chamber body so as to be inclined at a predetermined angle with respect to a direction in which the air or the gas is discharged through the outlet, wherein a direction perpendicular to a ground surface is defined as a z axis direction, a direction perpendicular to the direction in which the outlet is provided is defined as an x axis direction, and a direction perpendicular to the x axis direction is defined as a y axis direction.

The plasma torches may be provided on facing portions of the melting furnace chamber body, respectively, the facing portions being on both sides of the outlet.

The plasma torches may be provided on the facing portions of the melting furnace chamber body so as to be inclined asymmetrically to each other.

The plasma torches may be inclined at predetermined angles to deviate from the direction of the inlet and the direction of the outlet.

When it is assumed that a direction perpendicular to a support surface of the melting furnace chamber body is the "Z" axis direction, a direction parallel to the direction in which the outlet is formed is the "X" axis direction, and a direction perpendicular to the x axis direction is a "Y" axis direction, the angle of incline of the plasma torch may be inclined in the "Y" axis direction or in the "Z" and "Y" axis directions.

The plasma torches may be provided on portions of the melting furnace chamber body adjacent to the outlet.

The plasma torches may be inclined at different angles.

The angle of incline of the first plasma torch in the XY axes may be defined by the following formula (1):

$$\tan^{-1}(R/L) < \theta < \cos^{-1}(W/L') \quad (1),$$

where R is a radius of curvature of an injection of the plasma torch,
θ is a degree of incline of the plasma torch on a plane with respect to the XY axes,
L is a first distance on a plane with respect to the XY axes,
L' is a second distance on the plane in a melt with respect to the XY axes, and
W is a width of the melt.

The melting furnace chamber body may have a tap through which the melt produced in the cyclonic plasma melting furnace is discharged.

The angle of the plasma torch may be determined to be an angle within the range of an area in which a melt is stored on a plane with respect to the ground surface.

With respect to the area in which the melt is stored, the angle of incline of the plasma torch in the XZ axes may be defined by the following formula (2):

$$\cos(W/L'') < \theta < (90 - \tan^{-1}(R/L)) \quad (2),$$

where R is a radius of curvature of an injection of the plasma torch,
θ is a degree of incline of the plasma torch with respect to the XZ axes,
L is a first distance on a plane to the melt with respect to the XZ axes, L" is a second distance on a plane to the melt with respect to the XZ axes, and W is a width of the melt.

The area in which the melt is stored may be a recessed area of a portion adjacent to the outlet.

The plurality of melting furnace chamber bodies may be continuously arranged in a single direction.

In the cyclonic plasma melting furnace according to the present disclosure, the plasma torches of the plasma melting furnace, in which waste is received, are arranged in a specific structure, such that waste may be effectively thermally decomposed and melted in the entire area of the plasma melting furnace.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
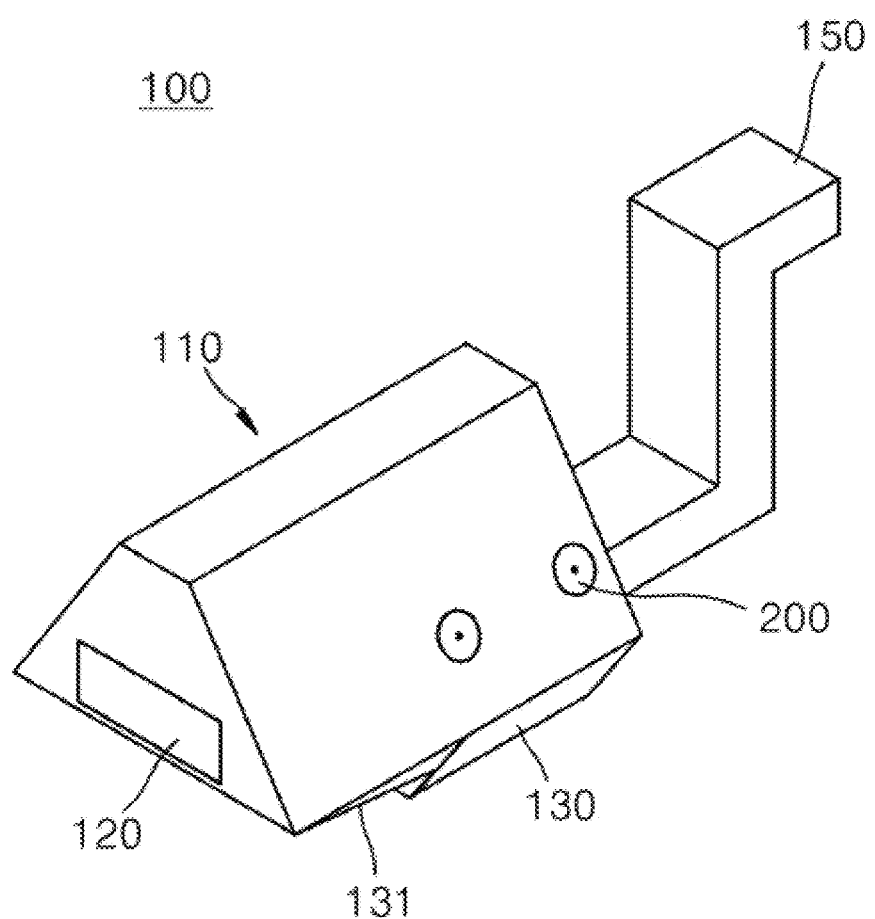
FIG. 1 is a perspective view illustrating a cyclonic plasma melting furnace according to the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted in the situation in which the subject matter of the present disclosure may be rendered rather unclear thereby.

In addition, terms, such as first, second, A, B, (a), (b) or the like may be used herein when describing components of embodiments of the present disclosure. Each of these terminologies is not used to define an essence, order or sequence of a corresponding component but used merely to distinguish the corresponding component from other component(s). Unless otherwise specified, all terms including technical and scientific terms used herein have the same meaning as that commonly understood by those skilled in the technical field to which the present disclosure belongs. It will be further understood that terms, such as those defined in commonly used dictionaries, should be interpreted as having a meaning that is consistent with their meaning in the context of the relevant art, and will not be interpreted in an idealized or overly formal sense unless clearly defined herein.

Figure 2:
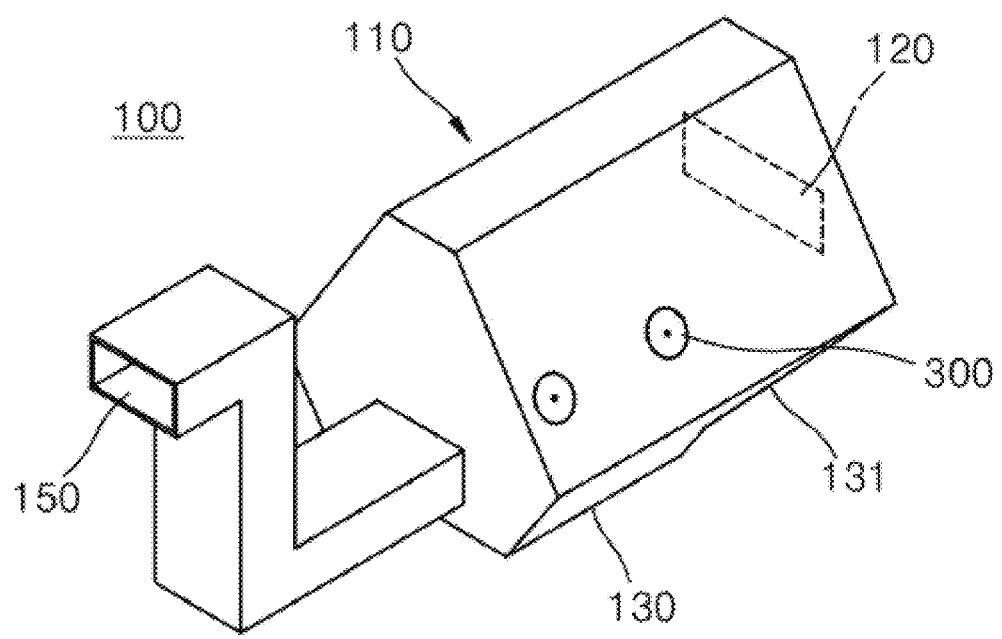
FIG. 2 is a transparent perspective view illustrating the cyclonic plasma melting furnace according to the present disclosure.

FIG. 1 is a perspective view illustrating a cyclonic plasma melting furnace according to the present disclosure, and FIG. 2 is a transparent perspective view illustrating the cyclonic plasma melting furnace according to the present disclosure.

Referring to FIGS. 1 and 2, a cyclonic plasma melting furnace 100 according to the present disclosure is an apparatus for thermally decomposing and melting waste. The cyclonic plasma melting furnace 100 may include: a plasma melting furnace chamber body 110 in which waste is received; and plasma torches 200 and 300 provided on one side of the melting furnace chamber body 110 to thermally decompose and melt the waste.

An inlet 120 through which the waste is input may be provided on one side of the melting furnace chamber body 110, and an outlet 150 through which gas produced due to the melting of the waste is discharged may be provided on the other side of the melting furnace chamber body 110, opposite to the inlet 120. In addition, a melt storage 130 may be provided in the lower portion of the melting furnace chamber body 110. The melt storage 130 stores therein slag produced from the waste melted by the plasma torches 200 and 300.

The melt storage 130 may be provided in the lower portion of the melting furnace chamber body 110 while being downwardly inclined at predetermined inclines from the inlet 120, through which the waste is input, such that the slag produced from the waste may be easily stored therein. Thus, after the waste has been melted, the waste may be easily trapped in the melt storage 130.

Figure 11:
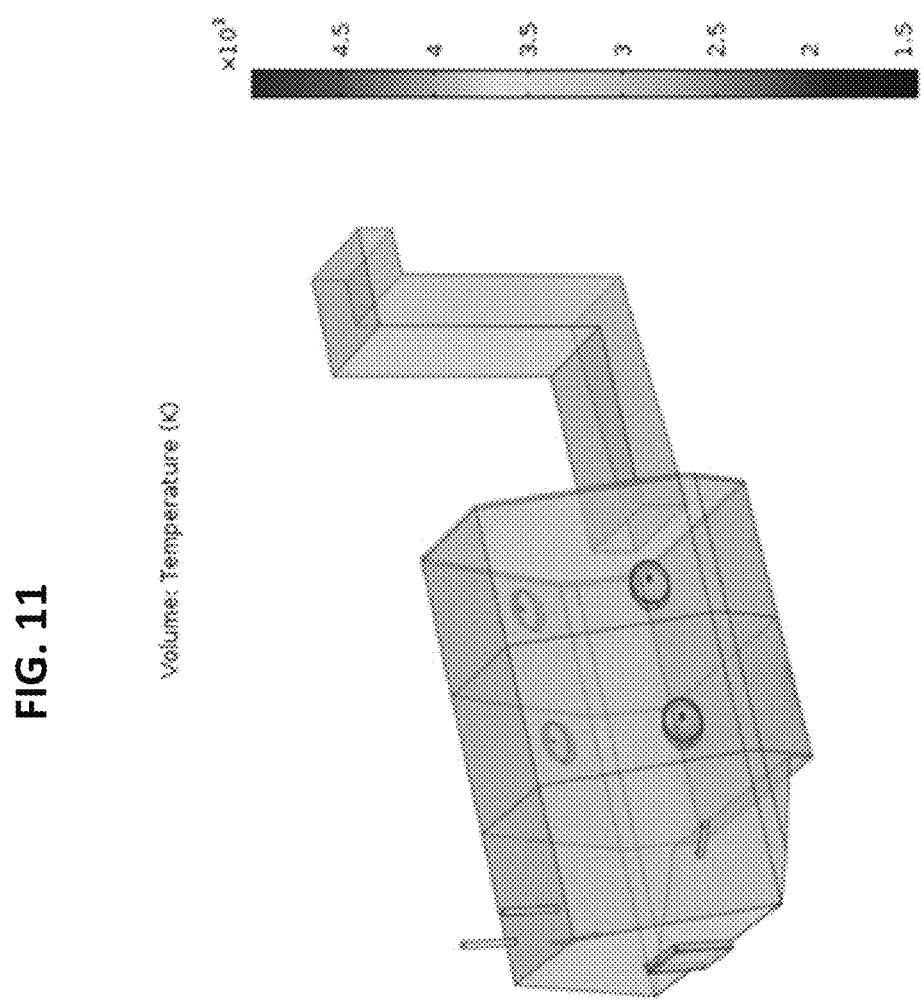
FIG. 11 illustrates a cyclonic plasma melting furnace according to the present disclosure, the capacity of which is increased.

In addition, the processing capacity of the cyclonic plasma melting furnace 100 according to the present disclosure may be increased depending on the environment of use. That is, as illustrated in FIG. 11, the melting furnace chamber body 110 of the cyclonic plasma melting furnace 100 may have a structure by which a plurality of melting furnace chamber bodies 110 may be connected in one direction and continuously arranged, thereby increasing the size of the cyclonic plasma melting furnace 100. In this case, a pair of plasma torches 200 and 300 may be provided on the opposite portions of each of the plurality of melting furnace chamber bodies 110 that continuously adjoin each other.

Here, the plasma torches 200 and 300 according to the present disclosure may be provided on the opposite portions of one side of the melting furnace chamber body 110 at predetermined angles, respectively. The plasma torches 200 and 300 provide the interior of the melting furnace chamber body 110 with melting heat by which the waste is melted. The plasma torches 200 and 300 provide plasma as the melting heat to the interior of the melting furnace chamber body 110. Each of the plasma torches 200 and 300 may include an electrode, a nozzle, and a cap, which are publicly-known in the art, while using air, nitrogen, oxygen, or the like as working gas.

As described above, angles of incline at which the plasma torches 200 and 300 are provided on the melting furnace chamber body 110 may be defined based on the assumption that a direction perpendicular to the support surface of the melting furnace chamber body 110 is a "Z" axis direction, a direction parallel to the direction in which the outlet 150 is formed is an "X" axis direction, and a direction perpendicular to the x axis direction is a "Y" axis direction. The plasma torches 200 and 300 provided at the angles of incline in this manner will be described in more detail below.

Figure 5:
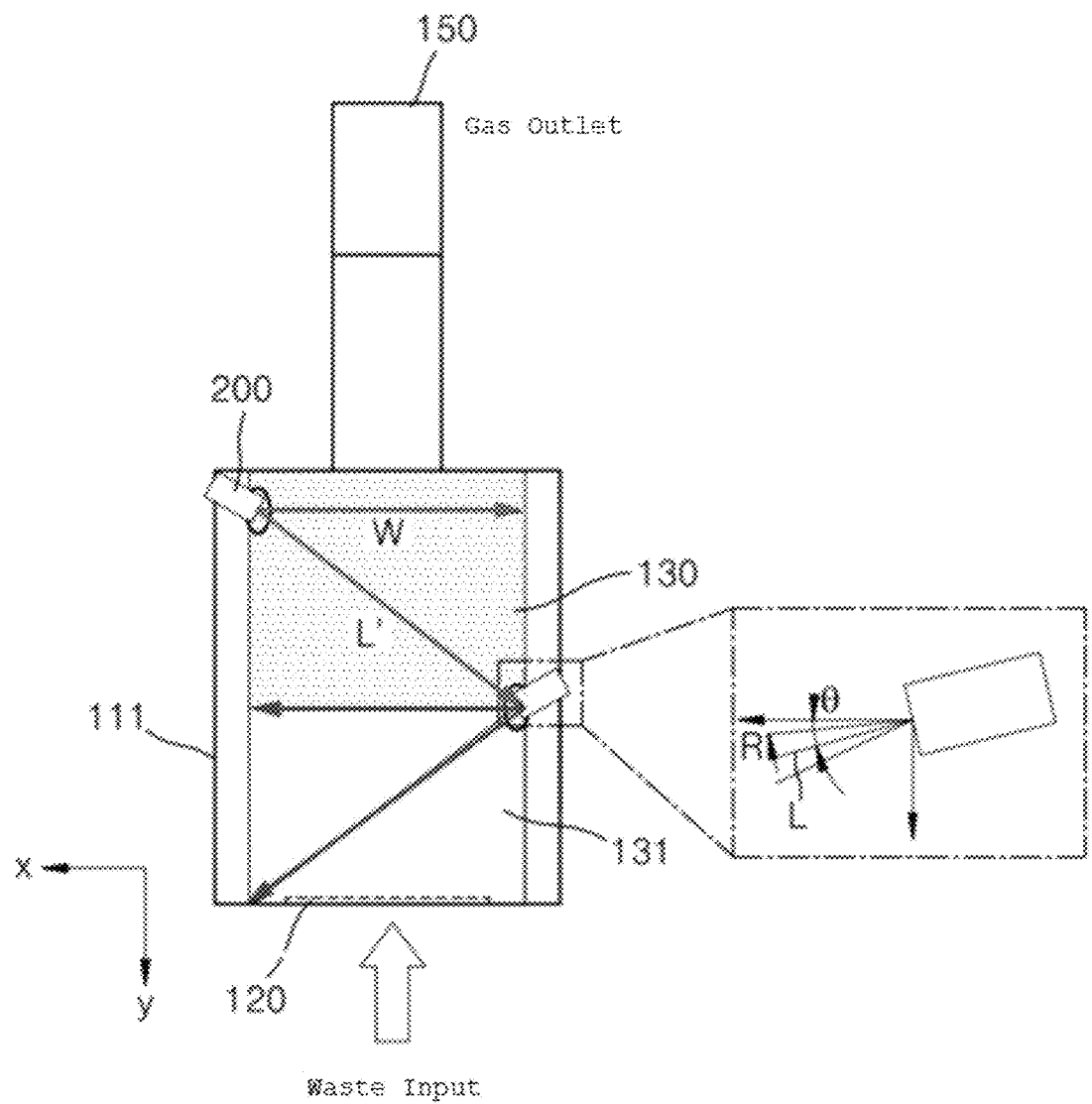
Figure 6:
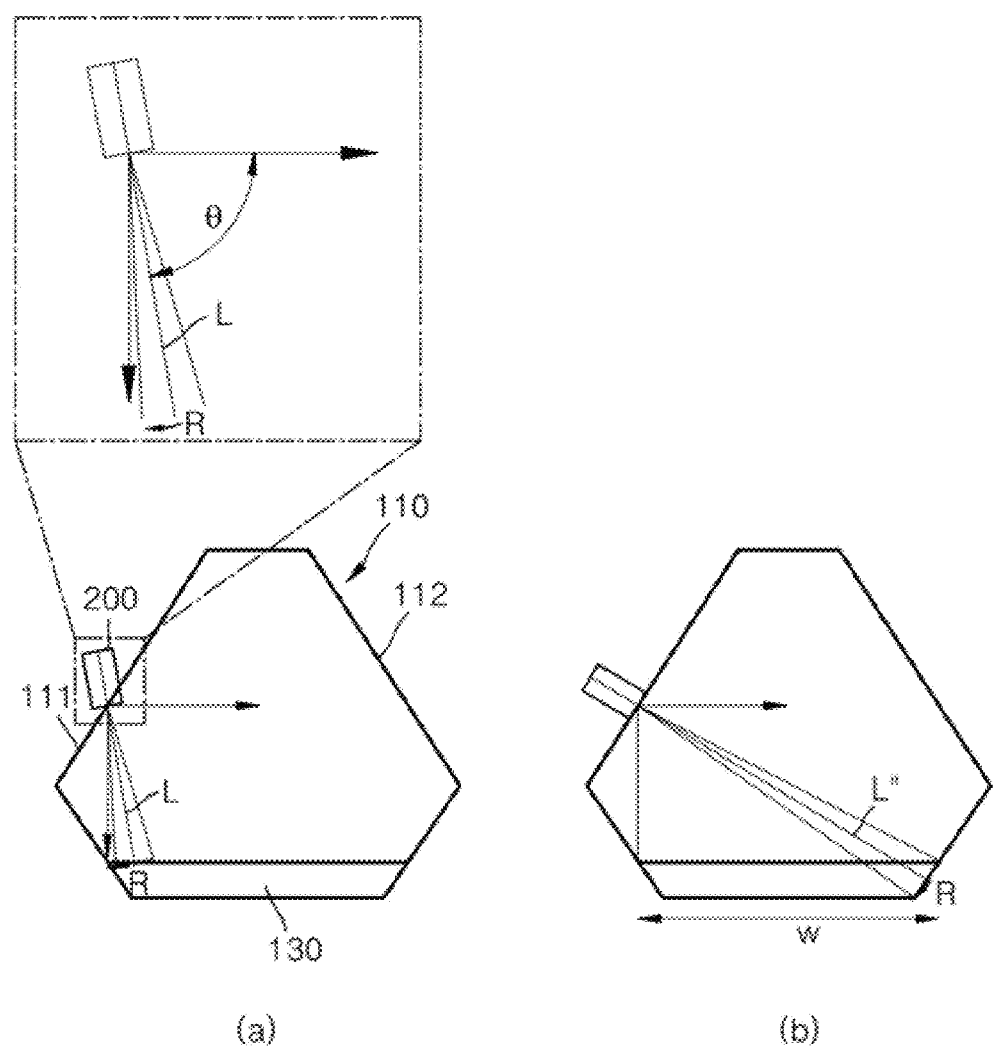
Figure 7:
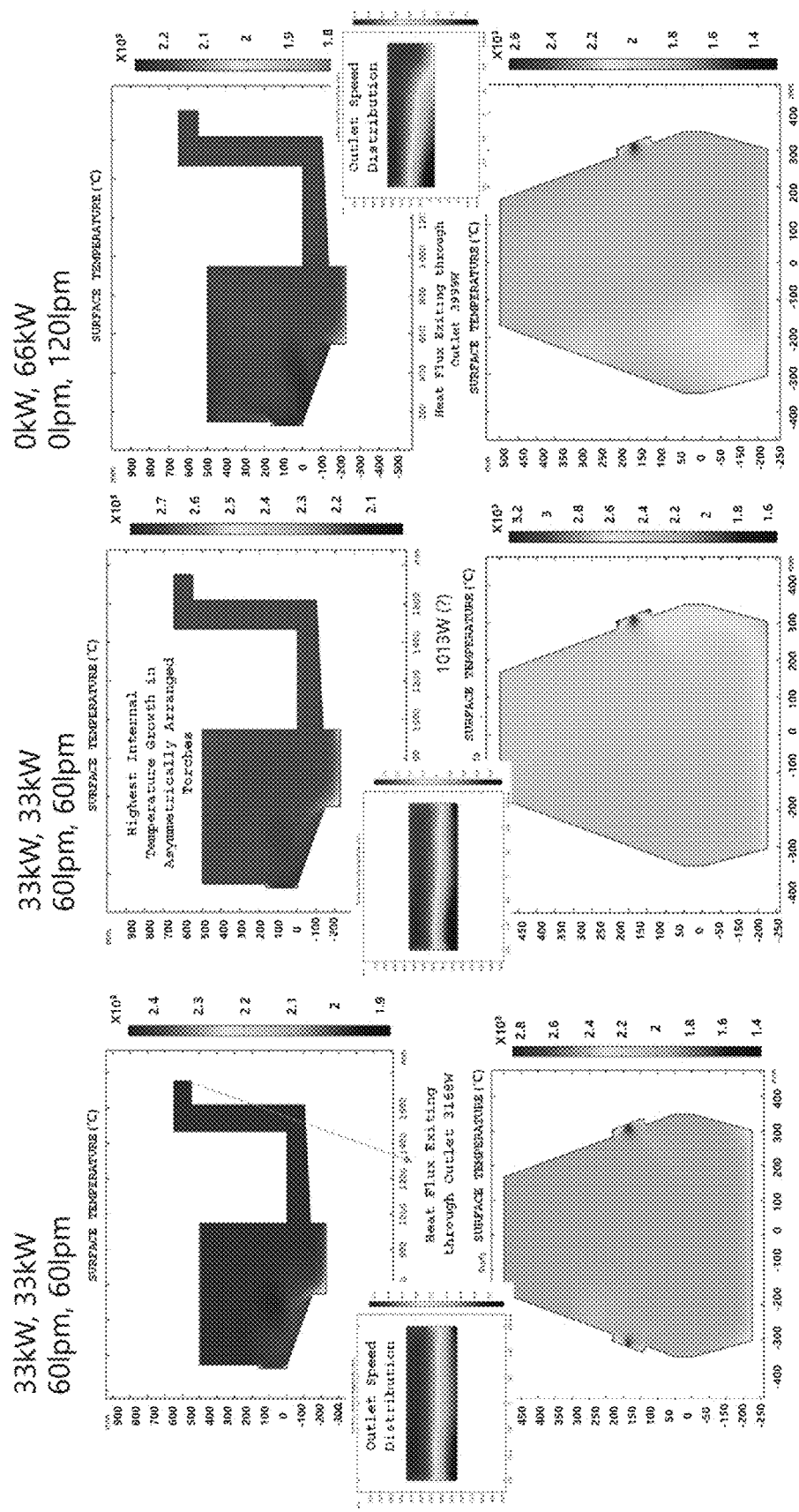
FIG. 7 illustrates temperature distributions of the cyclonic plasma melting furnace according to the present disclosure.
Figure 8:
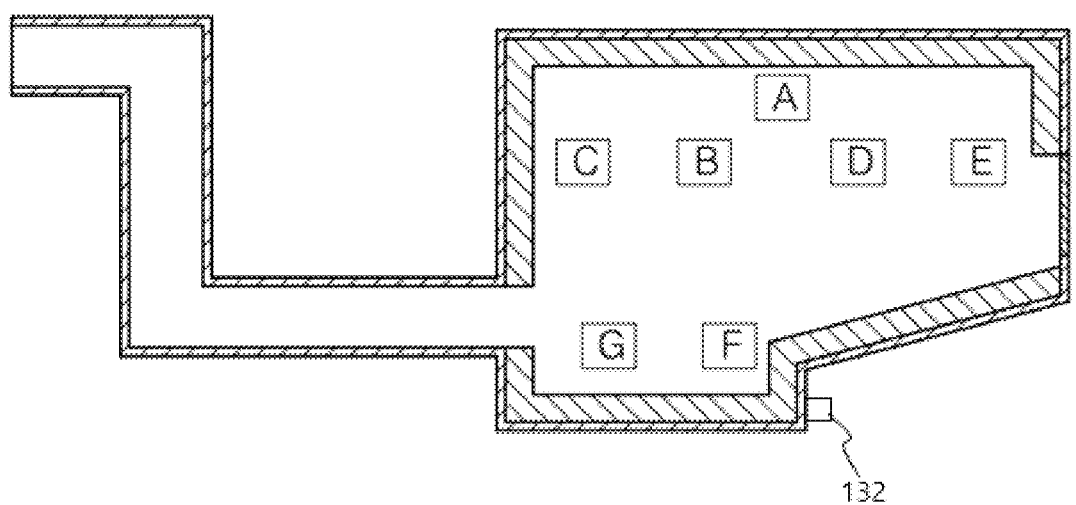
FIG. 8 is an example diagram illustrating specific points in the cyclonic plasma melting furnace according to the present disclosure.
Figure 9:
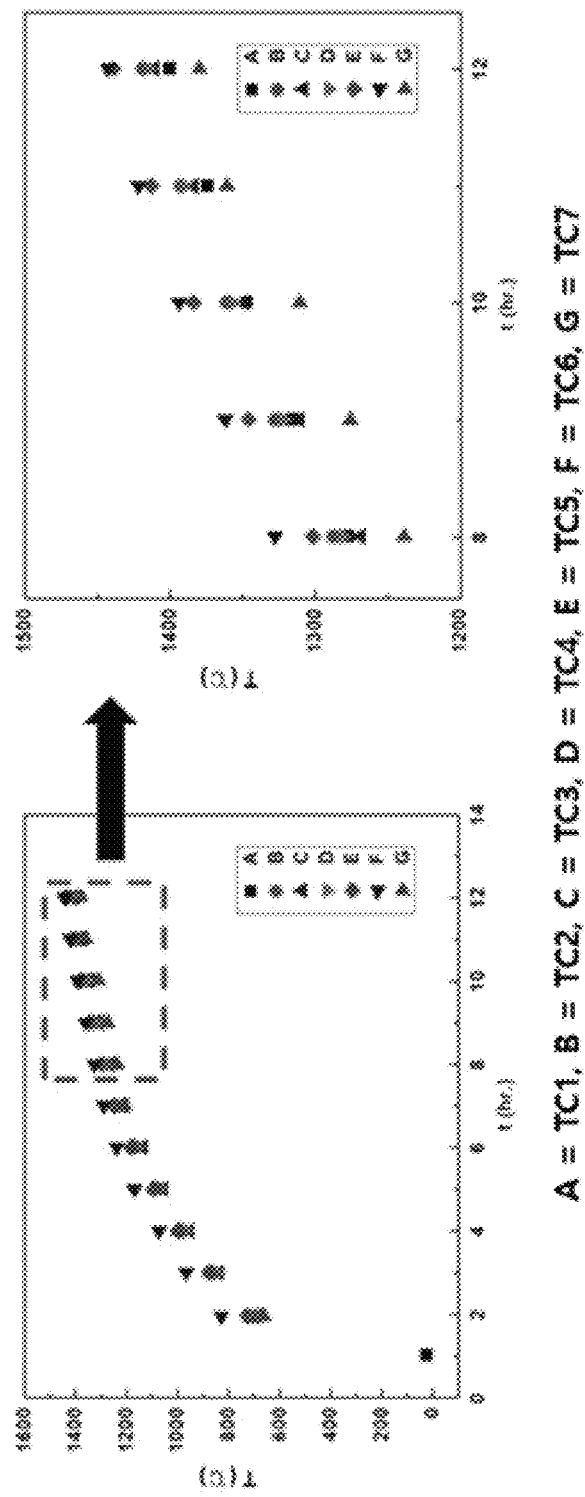
FIG. 9 is a graph illustrating temperature variations at the specific points in FIG. 8.
Figure 10:
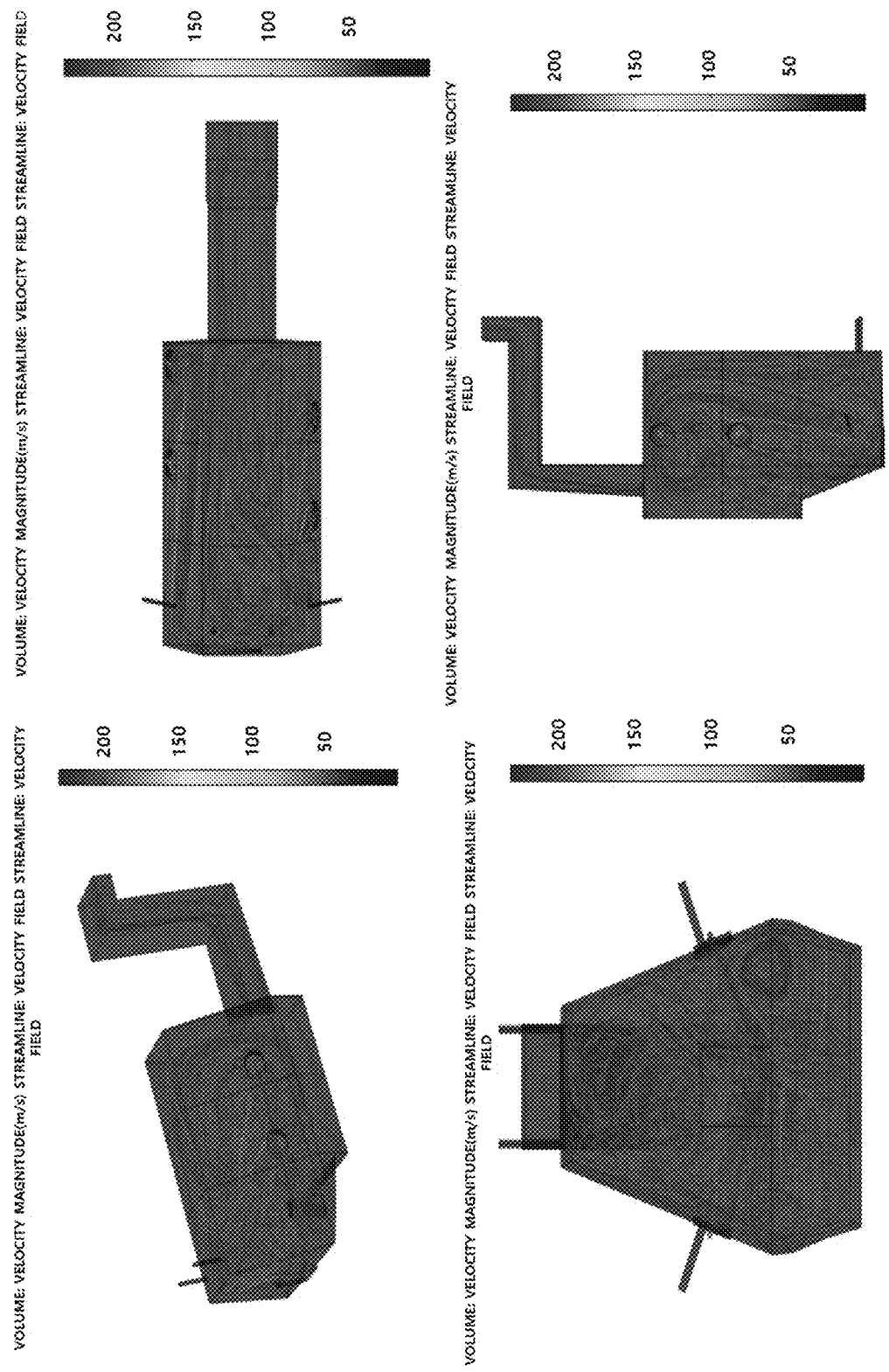
FIG. 10 illustrates a cyclone of gas in the cyclonic plasma melting furnace according to the present disclosure.

FIGS. 3 to 6 are configuration views illustrating the cyclonic plasma melting furnace according to the present disclosure, FIG. 7 illustrates temperature distributions of the cyclonic plasma melting furnace according to the present disclosure, FIG. 8 is an example diagram illustrating specific points in the cyclonic plasma melting furnace according to the present disclosure, FIG. 9 is a graph illustrating temperature variations at the specific points in FIG. 8, and FIG. 10 illustrates a cyclone of gas in the cyclonic plasma melting furnace according to the present disclosure.

Referring to FIGS. 3 to 10, the plasma torches 200 and 300 of the cyclonic plasma melting furnace 100 according to the present disclosure may be provided on the melting furnace chamber body 110 so as to be inclined at predetermined angles, respectively. Here, the plasma torches 200 and 300 may be provided on facing portions of a first mounting surface 111 and a second mounting surface 112 of the melting furnace chamber body 110, respectively. That is, the first plasma torch 200 may be provided on the first mounting surface 111, while the second plasma torch 300 may be provided on the second mounting surface 112 that faces the first mounting surface 111.

Specifically, the first plasma torch 200 may be provided on the portion of the melting furnace chamber body 110, adjacent to the outlet 150. The first plasma torch 200 may be provided on the first mounting surface 111, in a direction in which gas discharged from the first plasma torch 200 may be injected toward the second mounting surface 112. That is, when it is assumed that the direction perpendicular to the support surface of the melting furnace chamber body 110 is the "Z" axis direction, the direction parallel to the direction in which the outlet 150 is formed is the "X" axis direction, and the direction perpendicular to the x axis direction is the "Y" axis direction, the first plasma torch 200 may be provided in the "Y" axis direction and on the portion adjacent to the outlet 150 while being inclined in a direction away from the direction of the outlet 150 and the direction of the inlet 120.

In other words, the first plasma torch 200 is provided at a predetermined angle with respect to a virtual horizontal line connecting the inlet 120 and the outlet 150 of the melting furnace chamber body 110, and is configured such that gas discharged from the first plasma torch 200 does not directly face the inlet 120 or the outlet 150. This configuration may prevent the flame of the torch from directly contacting the waste input through the inlet 120 and prevent an increase in the flow rate of gas discharged through the outlet 150.

Here, according to the present disclosure, the angle θ of incline of the first plasma torch 200 in the XY axes may be within the range defined by the following formula (1):

$$\tan^{-1}(R/L) < \theta < \cos^{-1}(W/L') \qquad (1),$$

where R is the radius of curvature of an injection of the plasma torch,

θ is the degree of incline of the plasma torch on a plane with respect to the XY axes, L is a first distance on the plane with respect to the XY axes, L' is a second distance on a plane in the melt with respect to the XY axes, and W is the width of the melt.

Figure 3:
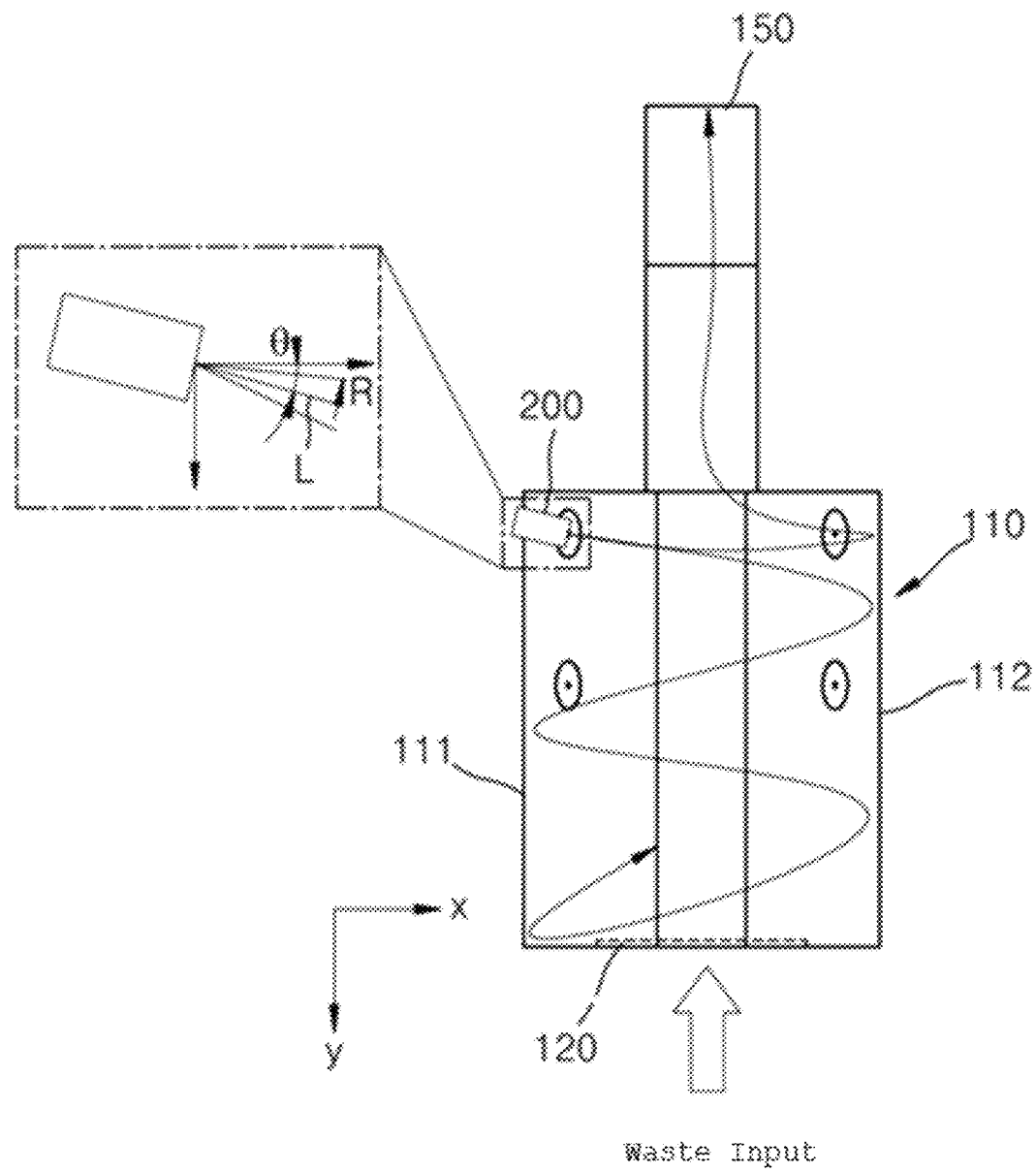
FIGS. 3 to 6 are configuration views illustrating the cyclonic plasma melting furnace according to the present disclosure.
Figure 4:
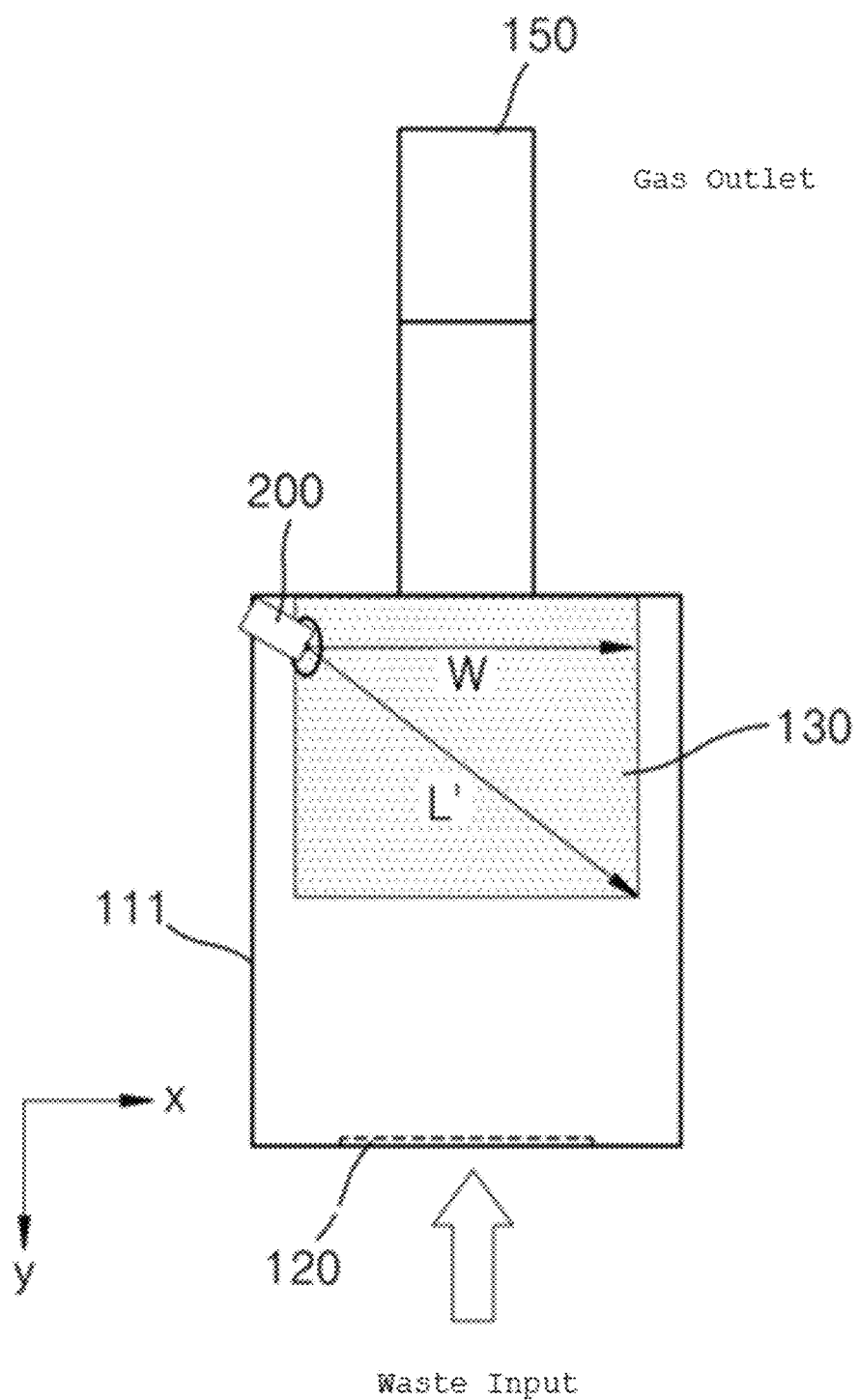

That is, the first plasma torch 200 according to the present disclosure may be provided such that the angle of incline thereof is within the range that does not exceed the diameter of the melt storage 130 provided in the lower portion of the melting furnace chamber body 110. For example, as illustrated in FIGS. 3 and 4, the first plasma torch 200 may be provided in the direction of the first distance L on the plane to be inclined at a predetermined degree of incline in the "Y" axis direction from the diameter W of the melt storage 130 in the "X" axis direction of the melt storage 130 while being provided at an angle at which the first plasma torch 200 does not deviate from the second distance L' along an straight line on a plane of the melt storage 130 in the direction of an oblique.

Thus, when the disposition position, the disposition direction, and the angle of incline of the first plasma torch 200 are determined as above, a flow of gas discharged from the first plasma torch 200 may be prevented from being stagnant at a position far away from the first plasma torch 200. Consequently, a turbulent flow may be easily formed in the melting furnace chamber body 110, thereby providing an environment in which the waste may be more effectively melted.

In the above-described structure, according to the present disclosure, the second plasma torch 300 may be provided at a predetermined incline on the second mounting surface 112 of the melting furnace chamber body 110 that faces the first mounting surface 111 on which the first plasma torch 200 is provided.

Here, the second plasma torch 300 may be provided at a degree of incline such that the first plasma torch 200 and the second plasma torch 300 are inclined asymmetrically to each other, as illustrated in FIG. 5. That is, the first plasma torch 200 and the second plasma torch 300 may be provided with degrees of incline in directions in which the first plasma torch 200 and the second plasma torch 300 do not face each other. For example, the first plasma torch 200 may be provided in the opposite direction so as not to face the outlet 150 while being inclined in the direction of the second mounting surface 112 at an angle of incline that does not deviate from the area in which the melt storage 130 is formed (see blue arrows in FIG. 5). In addition, the second plasma torch 300 may be inclined in a direction in which the second plasma torch 300 does not face the inlet 120 while being inclined in the direction of first mounting surface 111 (see red arrows in FIG. 5).

In addition, as illustrated in FIG. 5, the second plasma torch 300 may be provided on the boundary between the area in which the melt storage 130 is formed and an inclined surface 131. That is, the second plasma torch 300 may be provided at an angle of incline within the area in which the melt storage 130 is formed. In addition, the second plasma torch 300 may be provided at the corner along the diagonal among the outermost portions of the area of the melt storage 130, i.e. on the second mounting surface 112 facing the first mounting surface 111 on which the first plasma torch 200 is provided. Thus, as illustrated in FIG. 10, heat injected from the first plasma torch 200 may flow in the direction of the second plasma torch 300 and rotate to form a turbulent flow on the inclined surface 131, thereby easily generating turbulence.

In addition, when it is assumed that the direction perpendicular to the support surface of the melting furnace chamber body 110 is the "Z" axis direction, the direction parallel to the direction in which the outlet 150 is formed is the "X" axis direction, and the direction perpendicular to the x axis direction is the "Y" axis direction, the first plasma torch 200 may be provided to be inclined downward in the direction of the "Z" axis direction, i.e. in the direction of the melt storage 130. Although not shown in the drawings of the present disclosure, the second plasma torch 300 may be provided on the second mounting surface 112 so as to be downwardly inclined in the "Z" axis direction, as described above, while being inclined at a different degree of incline from the first plasma torch 200 such that the first plasma torch 200 and the second plasma torch 300 are arranged asymmetrically.

With respect to the area of the melt storage 130 in which the melt is stored, the angle θ of incline of the first plasma torch 200 in the XZ axes may be within the range defined by the following formula (2):

$$\cos(W/L'') < \theta < (90 - \tan^{-1}(R/L)) \quad (2),$$

where R is the radius of curvature of an injection of the plasma torch,

θ is the degree of incline of the plasma torch with respect to the XZ axes,

L is a first distance on a plane to the melt with respect to the XZ axes,

L" is a second distance on the plane to the melt with respect to the XZ axes, and W is the width of the melt.

That is, the first plasma torch 200 may be provided to be inclined downward in the direction of the melt storage 130. As illustrated in FIG. 6, the angle of incline θ of the first plasma torch 200 may have a degree of incline in the "Z" axis direction within the range of the diameter W of the melt storage 130.

Thus, when the first plasma torch 200 and second plasma torch 300 are provided asymmetrically to each other according to the disposition positions, the disposition directions, and the angles of incline described above, a flow of gas discharged from the first plasma torch 200 may be prevented from being stagnant at a position far away from the first plasma torch 200. Consequently, a turbulent flow may be easily formed in the melting furnace chamber body 110, thereby providing an environment in which the waste may be more effectively melted.

In order to review such an effect, in the present disclosure, the effect of the pair of plasma torches 200 and 300 arranged in the asymmetric structure was empirically reviewed. FIG. 7 illustrates results of a difference in internal temperature and a difference in heat flux discharged through the outlet 150 according to the plasma torches 200 and 300 when the same flow rate and power were introduced to the melting furnace chamber body 110. Referring to FIG. 7, it may be appreciated that the temperature within the melting furnace chamber body 110 is highest and the heat flux is relatively small when the pair of plasma torches 200 and 300 having the asymmetrical structure is provided (see FIG. 7 (*b*)), compared to a case in which the plasma torches 200 and 300 are provided symmetrically on both surfaces of the melting furnace chamber body 110, respectively (see FIG. 7 (*a*)) and a case in which a single plasma torch 200 is provided (see FIG. 7 (*c*)).

In addition, in the present disclosure, as illustrated in FIGS. 8 and 9, internal temperature variations were detected at points A, B, C, D, E, F, and G of a thermocouple (TC) in the melting furnace chamber body 110 in which the pair of plasma torches 200 and 300 having the asymmetrical structure is provided. It was appreciated that the temperature variations within the melting furnace chamber body 110 were approximately less than 50° C. in a condition of 1,400° C. or higher. In the melting furnace chamber body 110, the points F and E on the side of the inlet 120 have the highest temperatures while the points C and G on the side of the outlet 150 have the lowest temperatures, such that the temperature gradually decreases in the direction from the inlet 120, through which the waste is input, to the outlet 150. In addition, as illustrated in FIG. 10, it may be appreciated that a flow state linearly increasing within the range in which the flow rate to the outlet 150 is not excessively increased and having a turbulent flow without a death area was caused due to the pair of plasma torches 200 and 300 having the asymmetrical structure.

The above description provides an example of the technical idea of the present disclosure for illustrative purposes only, and those having ordinary skilled in the technical field to which the present disclosure pertains will appreciate that various modifications and changes are possible without departing from the essential features of the present disclosure.

Therefore, the embodiments disclosed in the present disclosure are intended not to limit but to illustrate the technical idea of the present disclosure, and the scope of the technical idea of the present disclosure is not limited by the embodiments. The scope of the present disclosure shall be construed on the basis of the accompanying claims, and all of the technical ideas included within the scope equivalent to the claims shall be construed as belonging to the scope of the present disclosure.

What is claimed is:

1. A cyclonic plasma melting furnace comprising:
   a melting furnace chamber body comprising an inlet through which waste is input and an outlet through which air or gas is discharged, the outlet being provided in a direction opposite to the inlet; and
   a plurality of plasma torches provided on the melting furnace chamber body so as to be inclined at a predetermined angle in a direction away from the inlet and outlet directions with respect to a direction in which the air or the gas is discharged through the outlet, but formed at a portion adjacent to the outlet of the melting furnace main body,
   wherein a direction perpendicular to a ground surface is defined as a z axis direction, a direction perpendicular to the direction in which the outlet is provided is defined as an x axis direction, and a direction perpendicular to the x axis direction is defined as a y axis direction,
   wherein the plurality of plasma torches are formed on the facing portions of the melting furnace chamber body centered on the outlet, and are asymmetrically arranged so that the flames of the plasma torches do not directly contact each other,
   wherein the plurality of plasma torches are inclined at predetermined angles to deviate from the direction of the inlet and the direction of the outlet,
   wherein the plurality of plasma torches are provided on the facing portions of the melting furnace chamber body so as to be inclined asymmetrically to each other.

2. The cyclonic plasma melting furnace of claim 1, wherein, when it is assumed that a direction perpendicular to a support surface of the melting furnace chamber body is the "Z" axis direction, a direction parallel to the direction in which the outlet is formed is the "X" axis direction, and a direction perpendicular to the x axis direction is a "Y" axis direction, the angle of incline of the plasma torch is inclined in the "Y" axis direction or in the "Z" and "Y" axis directions.

3. The cyclonic plasma melting furnace of claim 1, wherein the plurality of plasma torches are provided on portions of the melting furnace chamber body adjacent to the outlet.

4. The cyclonic plasma melting furnace of claim 1, wherein the plurality of plasma torches are inclined at different angles.

5. The cyclonic plasma melting furnace of claim 1, wherein the angle of incline of the first plasma torch in the XY axes is defined by the following formula (1):

$$\tan^{-1}(R/L) < \theta < \cos^{-1}(W/L') \quad (1),$$

where R is a radius of curvature of an injection of the plasma torch,
θ is a degree of incline of the plasma torch on a plane with respect to the XY axes,
L is a first distance on a plane with respect to the XY axes,
L' is a second distance on the plane in a melt with respect to the XY axes, and
W is a width of the melt.

6. The cyclonic plasma melting furnace of claim 1, wherein the melting furnace chamber body has a tap through which the melt produced in the cyclonic plasma melting furnace is discharged.

7. The cyclonic plasma melting furnace of claim 1, wherein the angle of the plasma torch is determined to be an angle within the range of an area in which a melt is stored on a plane with respect to the ground surface.

8. The cyclonic plasma melting furnace of claim 7, wherein, with respect to the area in which the melt is stored, the angle of incline of the plasma torch in the XZ axes is defined by the following formula (2):

$$\cos(W/L'') < \theta < (90 - \tan^{-1}(R/L)) \quad (2),$$

where R is a radius of curvature of an injection of the plasma torch,
θ is a degree of incline of the plasma torch with respect to the XZ axes,
L is a first distance on a plane to the melt with respect to the XZ axes,
L" is a second distance on a plane to the melt with respect to the XZ axes, and
W is a width of the melt.

9. The cyclonic plasma melting furnace of claim 7, wherein the area in which the melt is stored is a recessed area of a portion adjacent to the outlet.

10. The cyclonic plasma melting furnace of claim 1, further comprising:
a plurality of melting furnace chamber bodies including the melting furnace chamber body,
wherein the plurality of melting furnace chamber bodies are continuously arranged in a single direction.

* * * * *